United States Patent [19]

Ballard

[11] 4,329,603
[45] May 11, 1982

[54] DIRECTLY COOLED, ROTATING RECTIFIER ASSEMBLY FOR A SYNCHRONOUS MACHINE

[75] Inventor: Welton R. Ballard, Rockford, Ill.

[73] Assignee: Sundstrand Corporation, Rockford, Ill.

[21] Appl. No.: 38,817

[22] Filed: May 14, 1979

Related U.S. Application Data

[63] Continuation-in-part of Ser. No. 805,304, Jun. 10, 1977, abandoned.

[51] Int. Cl.³ .......................................... H02K 11/00
[52] U.S. Cl. .................................... 310/61; 310/54; 310/64; 310/68 D
[58] Field of Search .................. 310/68 D, 68 R, 52, 310/54, 58, 64, 65, 61; 363/144, 145; 357/82

[56] References Cited

U.S. PATENT DOCUMENTS

| | | | |
|---|---|---|---|
| 3,145,314 | 8/1964 | Becker | 310/61 X |
| 3,389,277 | 6/1968 | Fiore | 310/54 X |
| 3,562,564 | 2/1971 | Potter | 310/68 D X |
| 3,629,627 | 12/1971 | Dafler | 310/54 |
| 3,629,634 | 12/1971 | Dafler et al. | 310/54 |
| 3,733,503 | 5/1973 | Potter | 310/68 D |
| 3,812,390 | 5/1974 | Richards | 310/68 D |
| 3,866,072 | 2/1975 | Nagai | 310/68 D |
| 3,870,944 | 3/1975 | Ogawa et al. | 310/68 D X |
| 3,895,247 | 7/1975 | Iwata et al. | 310/68 D |
| 3,927,338 | 12/1975 | Vieilleribiere | 310/68 D |
| 3,959,676 | 5/1976 | Striker | 310/68 D |

FOREIGN PATENT DOCUMENTS 1104620  2/1968  United Kingdom.

Primary Examiner—Mark O. Budd
Attorney, Agent, or Firm—Wegner, Stellman, McCord, Wood & Dalton

[57] ABSTRACT

A plurality of individual semiconductor diode wafers secured to the rotor of a synchronous machine rectify AC from an excitation power source to provide DC to the main rotating field element. The diode wafers, connected as either a half wave or a full wave rectifier, are contained within a housing to form a rectifier assembly. The assembly is mounted directly on an inner surface of the housing carried on the shaft of the machine. The assembly is provided with suitable passageways or surfaces for flow of a non-electrically conductive cooling medium. In one embodiment, the cooling medium, as oil or air, traverses the surface of the diode wafers to provide high efficiency heat removal. In another embodiment the cooling medium traverses a heat sink on which the wafers are mounted to provide a high efficiency heat removal.

6 Claims, 6 Drawing Figures

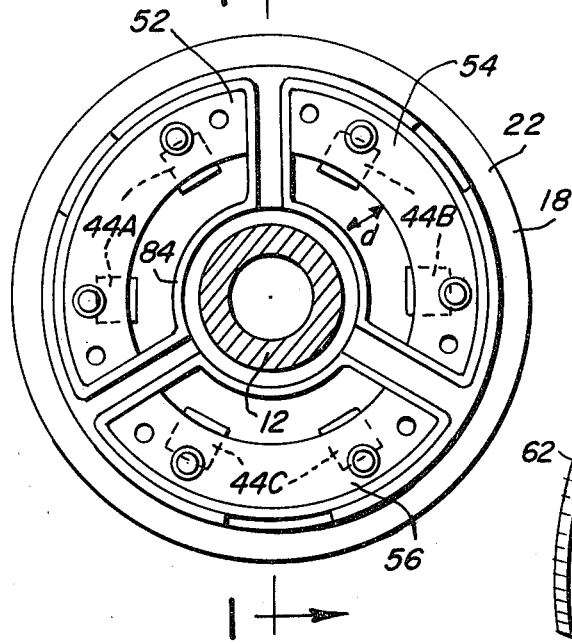
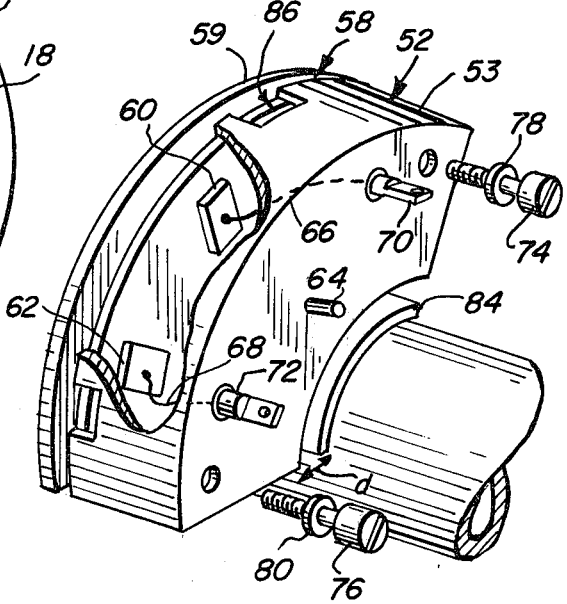
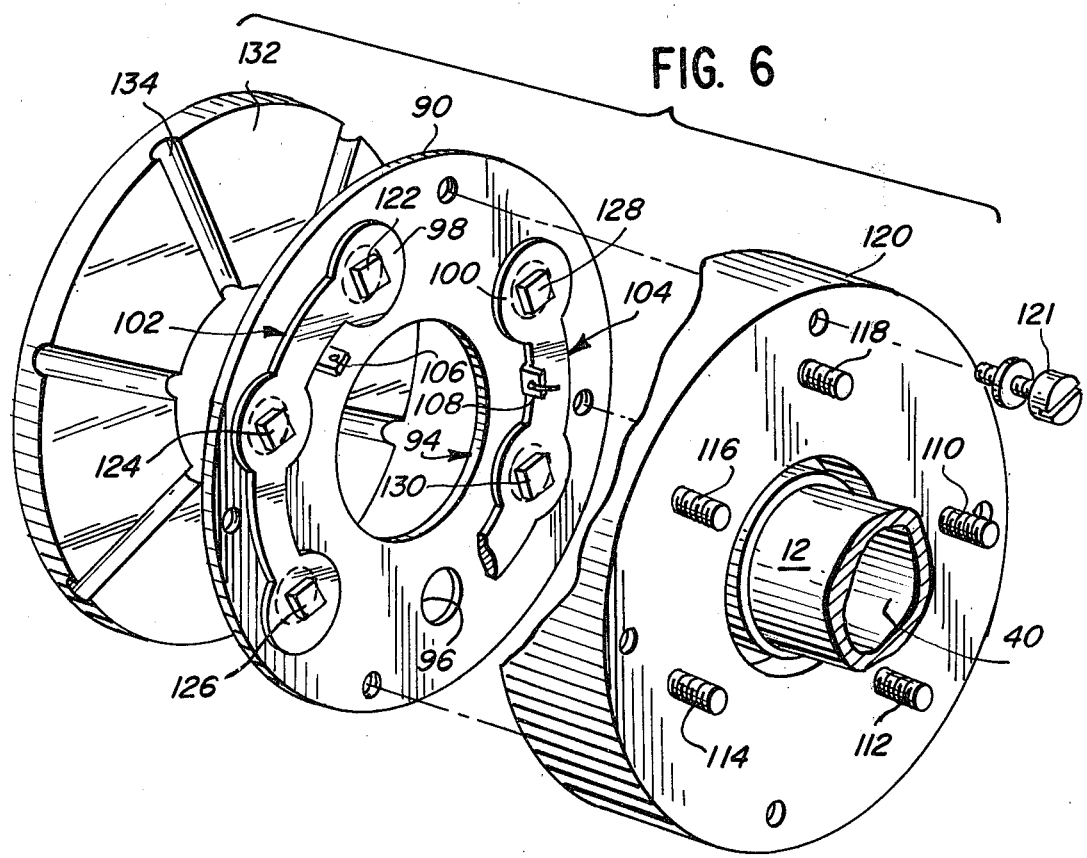

DIRECTLY COOLED, ROTATING RECTIFIER ASSEMBLY FOR A SYNCHRONOUS MACHINE

This application is a continuation-in-part of Ballard U.S. Ser. No. 805,304, filed June 10, 1977, now abandoned, and assigned to the assignee of this application.

BACKGROUND OF THE INVENTION

This invention relates to a rectifier assembly for use on the rotor of a synchronous machine such as a brushless alternating current generator or a brushless synchronous motor.

A synchronous machine, such as a brushless alternating current generator, has an exciter generator comprising a DC stator field with an AC armature on the rotor. A rectifier on the rotor rectifies AC from the exciter for the main generator DC field winding which is also located on the rotor. The main AC armature is on the stator and the AC voltage is available therefrom. An example of such a machine is provided by Sones et al U.S. Pat. No. 3,059,168. The rectifier typically uses individual semiconductor diode rectifiers mounted in a housing on the rotor shaft. Several disadvantages are encountered when employing individual semiconductor diode rectifiers. For example, mounting complexity is encountered due to the physical stresses from the rotational "G" forces at speeds up to 20,000 RPM, which are used in aircraft generators and motors. Also, since the casing of the semiconductor diode rectifier is usually the anode or the cathode of the device, the rectifier must be insulated from the mounting base if the mounting base is conductive. Moreover, reliability of the rectifier is degraded due to the complexity of the entire rectifier assembly. Also, effective cooling of the semiconductor diode rectifier is difficult as there is a high thermal resistance between the outer casing of the semiconductor diode assembly and the wafer within. Thus, even if the rectifier assembly is immersed in a cooling medium, inefficient cooling results.

Considering these drawbacks, I have developed a rectifier assembly for a synchronous machine which is easily mounted to the housing, insulated from the mounting base, capable of withstanding centrifugal force created at normal operating speeds and is efficiently cooled. The rectifier assembly can be connected to provide either half wave or full wave rectification.

SUMMARY OF THE INVENTION

A plurality of semiconductor wafers forming either a half wave or a full wave rectifier are attached directly to an inner section of a housing mounted on a shaft of the synchronous machine. In one embodiment, the assembly is provided with inlets and outlets for the passage of a cooling medium. The cooling medium traverses the surface of the semiconductor wafers to provide high efficiency heat removal. In another embodiment, the cooling medium traverses the face of a heat sink on which the wafers are mounted.

It is a feature of the present invention to provide a rectifier assembly which permits the cooling medium to traverse the surface of the semiconductor wafers within the rectifier assembly.

Another feature of the present invention is to provide a rectifier assembly having a heat sink wherein the cooling medium traverses the heat sink to remove heat.

Yet another feature of the present invention is to provide a rectifier assembly which is efficiently cooled and capable of withstanding high centrifugal forces and has a high reliability.

Other features of the invention will become apparent when considering the specification and the drawings, in which:

DRAWINGS

FIG. 4 is an end view of the rectifier assembly of FIG. 1, taken along line 4—4;

FIG. 5 is a perspective view of one of the three casings which house the semiconductor wafers of the rectifier assembly; and FIG. 6 is an exploded perspective view of an alternative construction of the rectifier assembly.

DESCRIPTION OF THE PREFERRED EMBODIMENT

Figure 1:
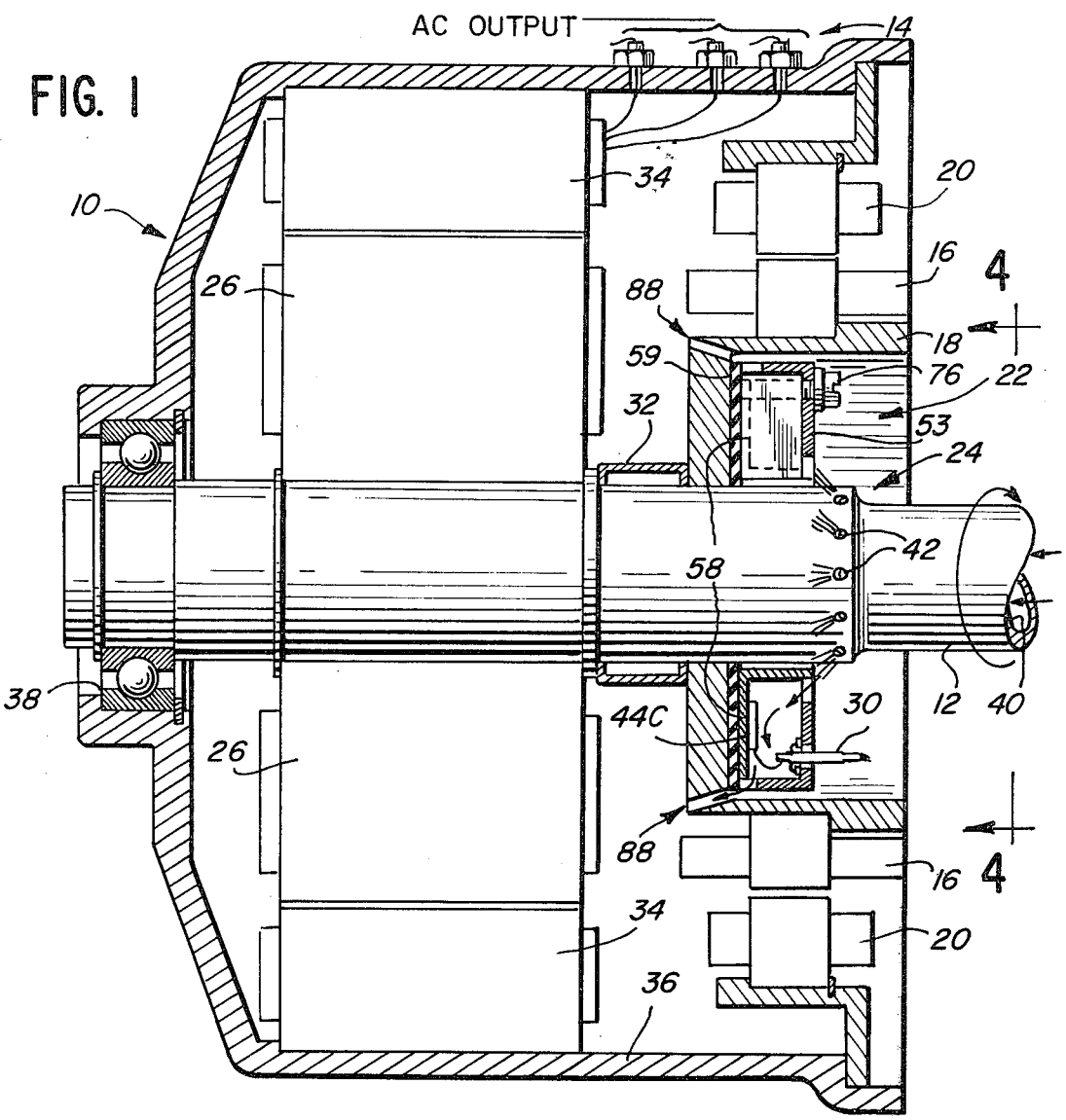
FIG. 1 is a cross-sectional view of a brushless generator having a rectifier assembly of the present invention.

Referring to FIG. 1, a brushless alternating current generator 10 is shown. Although the invention will be described for use in conjunction with a synchronous generator, it also may be used with a synchronous motor. The generator 10 includes rotatable shaft 12 driven by an external prime mover (not shown). An AC output is derived from terminals 14. As shaft 12 rotates, AC armature 16, wound around an annular housing 18, cuts through the DC exciter field established by DC windings 20, providing a polyphase excitation power source for the AC generator. The AC from armature 16 is rectified by rectifier assembly 22 which is located in an inner section 24 of annular housing 18. Rectifier assembly 22 is connected either as a half wave or a full wave rectifier and is coupled to DC field winding 26 by leads (not shown) from the terminals, as terminal 30.

DC field windings 26 are secured to shaft 12 and spaced apart from housing 18 by spacer 32. The current provided DC field winding 26 establishes a DC field which cuts through AC output windings 34 as shaft 12 rotates. The AC output windings 34 are connected to terminals 14.

The generator is enclosed by housing 36 and shaft 12 is mounted for rotating in bearing 38. Shaft 12 has a central passage 40 for flow of a cooling medium, as oil. Baits U.S. Pat. No. 3,576,143 shows further details of such a cooling system. Coolant is directed from shaft 12 through ports 42 to the rectifier assembly 22, as will appear.

Figure 2:
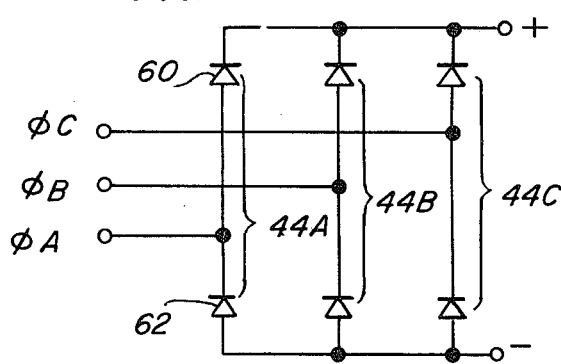
FIG. 2 is a schematic diagram of a full wave rectifier for converting three-phase AC to DC.
Figure 3:
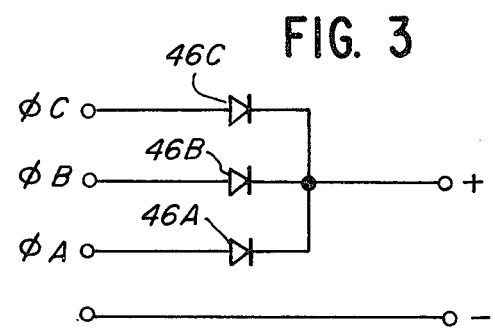
FIG. 3 is a schematic diagram of a half wave rectifier for converting three-phase AC to DC.

An electrical schematic of a full wave rectifier is shown in FIG. 2 as having three pairs of diodes 44A, 44B and 44C. An electrical schematic of a half wave rectifier having diodes 46A, 46B and 46C is shown in FIG. 3. As will be explained in greater detail below, rectifier assembly 22 is connected either as a full wave or a half wave rectifier. In either case, the DC voltage output therefrom is provided to DC windings 26.

In FIG. 4, rectifier assembly 22 is shown and includes three individual casings 52, 54 and 56 symmetrically disposed about shaft 12 in inner section 24 of annular housing 18. Each casing contains one of the diode pairs 44A, 44B, 44C. The leads from the diodes of each casing may be interconnected to form the full wave rectifier of FIG. 2.

Referring also to FIG. 5, the construction of casing 52 will be considered. Casings 54 and 56 are similar and will not be described in detail. Cover 53 of casing 52 is mounted on a conductive shell 58. Diode wafers, such as semiconductor wafers 60 and 62, are mechanically and electrically attached to conductive shell 58. Specifically, the flat planar anode surface of diode wafer 60 is attached to shell 58 and the flat planar cathode surface of diode wafer 62 is attached to shell 58. High temperature solder or an adhesive which is electrically conductive may be used to attach the wafers to the shell. The conductive shell 58 provides a common terminal between wafers 60 and 62 of diode pair 40 for applying phase A of the AC voltage input (FIG. 2). Since cover 53 is in mechanical contact with shell 58, terminal 64 mounted on cover 53 is used for connecting the conductive shell 58 with the polyphase AC source. Leads 66 and 68 are secured to the upper surface of wafers 60 and 62, respectively, to connect the diodes to terminals 70 and 72 which are mounted on, but electrically insulated from, cover 53. A coating compatible with the coolant medium may be applied over the chips to isolate them from contaminants. With an oil coolant, an oil resistant passivation material, as an anhydride catalyzed epoxy resin, is suitable.

Casing 52 is electrically insulated from the annular housing 18 by insulating pad 59 and is attached to housing 18 by screws 74 and 76 which extend through the pad. Insulating washers 78 and 80 electrically insulate the screws from cover 53. Cover 53 is spaced apart from the inner wall 84 of the base plate by a distance d to form an arcuate inlet. Coolant material, as lubricating oil, flowing in a direction generally parallel with the shaft 12 from ports 42, enters the inner cavity of casing 52 between inner wall 84 and cover 53. The coolant material flows across the surface of wafers 60 and 62, or across the protective coating, in direct contact with the wafers, providing efficient heat removal. The rectifier diodes operate at substantially lower temperatures than in prior art systems, increasing diode life and reliability. Centrifugal force from rotation of the rotor causes the coolant to flow over the diodes 60 and 62 and out of the casing 52 through outlet slots 86 in cover 53. Annular housing 18 is provided with channels 88, FIG. 1, through which coolant flows away from the rectifier assembly.

Referring to FIG. 6, an alternate construction of the rectifier assembly is shown. Nonconductive plate 90 forms the base of assembly 92. Plate 90 has a large center hole 94 which accommodates shaft 12, and six small holes, as hole 96, for cooling, as will be explained below.

Diode triplet assemblies 98 and 100 are secured to the nonconductive base plate 90. Each triplet assembly has three diodes secured to the surface of conductive heat sinks 102 and 104. Conductors (not shown) are secured to each individual diode wafer of the triplet assemblies and to solder tabs 106 and 108. The other ends of the conductors are coupled to terminals 110, 112, 114, 116 and 118, which are mounted on nonconductive cover 120. The connection of the conductors with the wafers and tabs 106 and 108 correspond to the connections shown in the schematic diagram of FIG. 2. Cover 120 is secured to base plate 90 by screws 121. The interior of the cover may be filled with a suitable insulating material, as an epoxy.

The construction of diode triplet assembly 98 will now be described. Wafers 122, 124 and 126 are electrically and mechanically attached to conductive heat sink 102. Each of the wafers represents one-half of the diode pair 44A, 44B, 44C, respectively, as best shown in FIG. 2. The flat planar cathode surface of each of the wafers 122, 124 and 126 is attached to conductive heat sink 102. Positive DC potential is therefore available from tab 106.

The construction of diode triplet assembly 100 will now be described. Wafers 128 and 130 and a third diode (not shown) are electrically and mechanically attached to conductive heat sink 104. Each of the wafers represents the other half of the diode pairs, 44A, 44B, 44C. The flat planar anode surface of each of the wafers 128 and 130 and the third diode is attached to the conductive heat sink 104. Negative DC potential is available from tab 108.

Assembly 92 is attached to the base 132 of annular housing 18 of AC armature 16 of the generating system 10 by an adhesive. Base 132 is provided with radial passageways or openings 134 through which the cooling medium flows outwardly from shaft 12. Efficient heat removal occurs when the cooling medium traverses the rear side of heat sinks 102 and 104 through the six holes, as hole 96.

The above explanation specifically relates to rectifier assemblies providing full wave rectification. A half wave rectifier, as shown in FIG. 3, could be constructed by providing casings 52, 54 and 56 with a single diode wafer representing diodes 46A, 46B, 46C (as shown in FIG 2). Similarly, if a half wave rectifier is employed in the assembly shown in FIG. 6, only one diode triplet would be employed. In such a case, rotational balance must be maintained as by mounting a counterbalance on base plate 90.

Finally, although the use of silicon wafers is preferred, diode wafers constructed of other semiconductor materials may also be used.

I claim:

1. In a synchronous rotary electric machine having a rotor with a hollow shaft for the circulation of a coolant, a multiphase AC winding and a DC winding, an improved rectifier assembly connected between the AC winding and the DC winding, comprising:
    a carrier plate on said shaft and in a plane generally at right angles thereto;
    a plurality of diode wafers mounted on said carrier plate;
    a cover for said carrier plate and diode wafers, said cover having an outer periphery;
    terminal means in said cover connected with said diode wafers and said carrier plate for connection with said windings;
    means for directing a flow of coolant from said shaft outwardly in heat exchange relation with each of said diode wafers; and
    an outlet aperture for the flow of coolant in the outer periphery of said cover.

2. The rectifier assembly of claim 1 in which coolant is sprayed outwardly from an aperture in said shaft and said cover is offset axially of the shaft from said aperture and spaced radially from said shaft to provide a coolant inlet.

3. In a synchronous rotary electric machine having a rotor with a hollow shaft for the circulation of coolant, a multiphase AC winding and a DC winding, an improved rectifier assembly connected between the AC winding and the DC winding, comprising:

a carrier plate on said shaft and in a plane generally at right angles thereto;

a plurality of diode wafers mounted on said carrier plate;

a sheet of insulating material for mounting said carrier plate thereon, said sheet having holes therein aligned with the positions of the diode wafers on the carrier plate;

means connecting the diode wafers in a rectifier circuit between said AC and DC windings; and means for directing a flow of coolant from said shaft across the surface of said carrier plate remote from said wafers and past said holes.

4. The rectifier assembly of claim 3 in which means are provided defining flow passages extending outwardly from said hollow rotor shaft past the holes in said plate of insulating material.

5. In a synchronous machine having a rotor with AC and DC windings, a rectifier assembly rotatable with the rotor and connected between the AC and DC windings, comprising:

a conductive base secured to the rotor;

first and second diode wafers having an anode surface and a cathode surface, the anode surface of the first diode wafer and the cathode surface of the second diode wafer attached to and electrically conductive with the conductive base;

a cover mounted over the base to form a housing for said diode wafers;

terminal means mounted on the housing;

means connecting the cathode of the first diode wafer, the anode of the second diode wafer and the conductive base to the terminal means; and means for providing a cooling medium to said diode wafers for direct cooling thereof.

6. The rectifier assembly of claim 5 wherein the means for providing a cooling medium to the first and second diode wafers include:

an opening in the housing for providing an inlet for the cooling medium; and a plurality of slots in the outer periphery of the housing for providing an outlet for the cooling medium.

* * * * *